US008170109B2

(12) United States Patent  (10) Patent No.: US 8,170,109 B2
Gaude et al.  (45) Date of Patent: May 1, 2012

(54) SYSTEM FOR ANALYSIS OF MOTION

(75) Inventors: Nicolas Gaude, Issy les Moulineaux (FR); Vincent Duval, Noisy le Grand (FR)

(73) Assignee: NDS Limited, Middlesex (GB)

( * ) Notice: Subject to any disclaimer, the term of this patent is extended or adjusted under 35 U.S.C. 154(b) by 867 days.

(21) Appl. No.: 12/279,208

(22) PCT Filed: Mar. 23, 2006

(86) PCT No.: PCT/GB2006/001070
§ 371 (c)(1),
(2), (4) Date: Oct. 16, 2008

(87) PCT Pub. No.: WO2007/107685
PCT Pub. Date: Sep. 27, 2007

(65) Prior Publication Data
US 2009/0310681 A1  Dec. 17, 2009

(51) Int. Cl.
*H04N 7/12* (2006.01)
(52) U.S. Cl. .................................. 375/240.16
(58) Field of Classification Search ............... 375/240.01–240.29; *H04N 7/12*
See application file for complete search history.

(56) References Cited

U.S. PATENT DOCUMENTS

| 5,936,679 | A | 8/1999 | Kasahara et al. |
| 6,370,196 | B1 | 4/2002 | Griessel et al. |
| 6,370,270 | B1 | 4/2002 | Nair et al. |
| 6,658,059 | B1 | 12/2003 | Iu et al. |
| 7,447,337 | B2 * | 11/2008 | Zhang et al. .................. 382/107 |
| 7,505,045 | B2 * | 3/2009 | Clark ............................ 345/601 |
| 2005/0100207 | A1 | 5/2005 | Konolige |

FOREIGN PATENT DOCUMENTS

| EP | 0 557 007 | 2/1993 |
| EP | 0 966 727 | 2/1998 |
| WO | 98/03021 | 1/1998 |
| WO | 01/96982 | 12/2001 |
| WO | 02/30117 | 4/2002 |

(Continued)

OTHER PUBLICATIONS translation of an Office action issued by the Chinese Patent Office on Aug. 4, 2010 in corresponding Application No. 200680053856.9.

(Continued)

*Primary Examiner* — Y Lee
*Assistant Examiner* — Paola Abi-Nader
(74) *Attorney, Agent, or Firm* — Ladas & Parry LLP

(57) ABSTRACT

A computer system for real-time determination of a motion vector comprising an image processor to apply an image processing filter to a normalized frame element of a first image frame, yielding a filtered frame element having associated filtered pixel values, a pixel selector to select a first reference pixel from the filtered frame element having the highest value of the filtered pixel values, an optic flow module to determine a first optic flow applied at a location of the first reference pixel, a pattern matching module to perform pattern matching between the normalized pixel values of the normalized frame element and normalized frame elements of a second image frame, yielding a plurality of pattern matching scores, and a motion vector determiner to determine a motion vector based on a lowest one of the pattern matching scores. Related apparatus and methods are also described.

23 Claims, 7 Drawing Sheets

FOREIGN PATENT DOCUMENTS

WO 2005/006762 1/2005

OTHER PUBLICATIONS

Office Action Issued by the Australian Patent Office on Oct. 12, 2010 in Corresponding Application No. 2006340623.

Korean Office Action With Translation Issued on Sep. 30, 2011.

Ahmad M B et al: "Motion Vector estimation using edge oriented block matching algorithm for video sequences" Image Processing, 2000. Proceedings 2000 International Conference on Sep. 10-13, 2000, Piscataway NJ vol. 1, Sep. 10, 2000, pp. 860-863.

Davis C Q et al: Equivalence of subpixel motion estimators based on optical flow and block matching Computer Vision, 1995. Proceedings,. International Symposium on Coral Gables, FL, USA Nov. 21-23, 1995, Los Alamitos, CA Nov. 21, 1995, pp. 7-12.

Ezhilarasan M et al: "An efficient block matching algorithm for fast motion estimation in video compression" Signal Processing and Communications, 2004. SPCOM '04 2004 International Conference on Bangalore, India Dec. 11-14, 2004, Piscataway NJ Dec. 11, 2004 pp. 301-304.

Gilge M Ed—Penningtom K S et al International Society for Optical Engineering: "Motion Estimation by Scene Adaptive Block Matching (SABM) and Illumination Correction" Image Processing Algorithms and Techniqoes. Santa Clara, Feb. 12-14, 1990, Proceedings of SPIE, Belingham, SPIE, US, vol. Vo. 1244. Feb. 12, 1990, pp. 355-366.

Krishnamurthy R et al: "Optical flow techniques applied to video coding" Proceedings of the International Conference on Image Processing. Washingtom , Oct. 23-26, 1995, Los Alamitos. vol. 3, Oct. 23, 1995, pp. 570-573.

Oh H-S et al: "Block-matching alorithm based on an adaptive reduction of the search area for motion estimation" Real-Time Imaging, Academic Press Limited, GB, vol. 6, No. 5 Oct. 2000, pp. 407-414.

Ng A C K et al: "A new fast motion estimation algorithm based on search window sub-sampling and object boundary pixel block matching" Image Processing, 1998. Proceedings. 1998 International Conference in Chicago, IL, USA Oct. 4-7, 1998, Los Alamitos, CA USA, Comput Soc, US vol. 3, Oct. 4, 1998, pp. 605-608.

Notification of Transmittal of the International Search Report and the Written Opinion of the International Searching Authority, or the Declaration for PCT/GB2006/001070.

English Abstract of EP 0966727 (first page of WO 98/41950).

\* cited by examiner

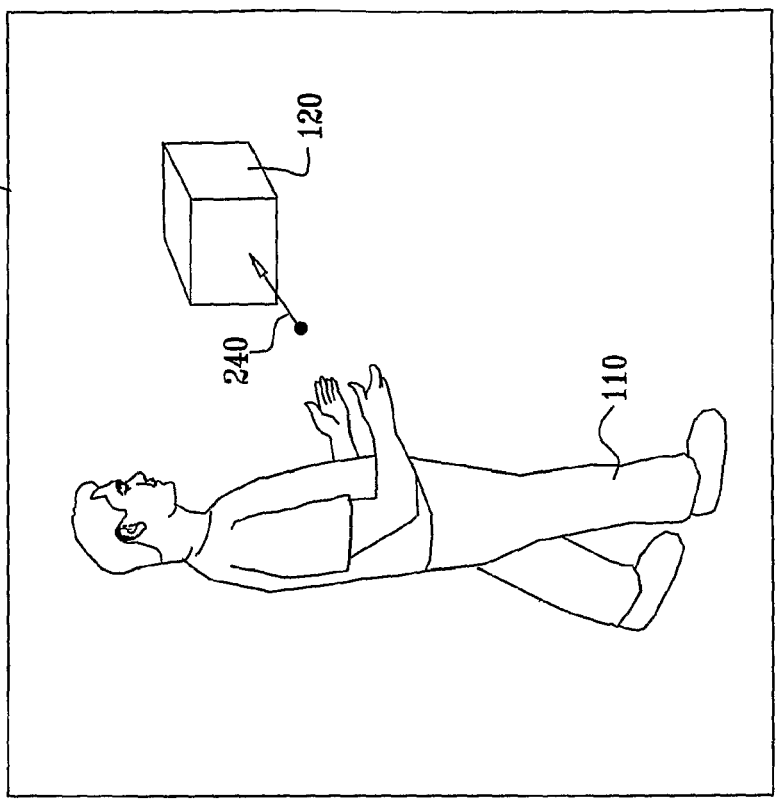
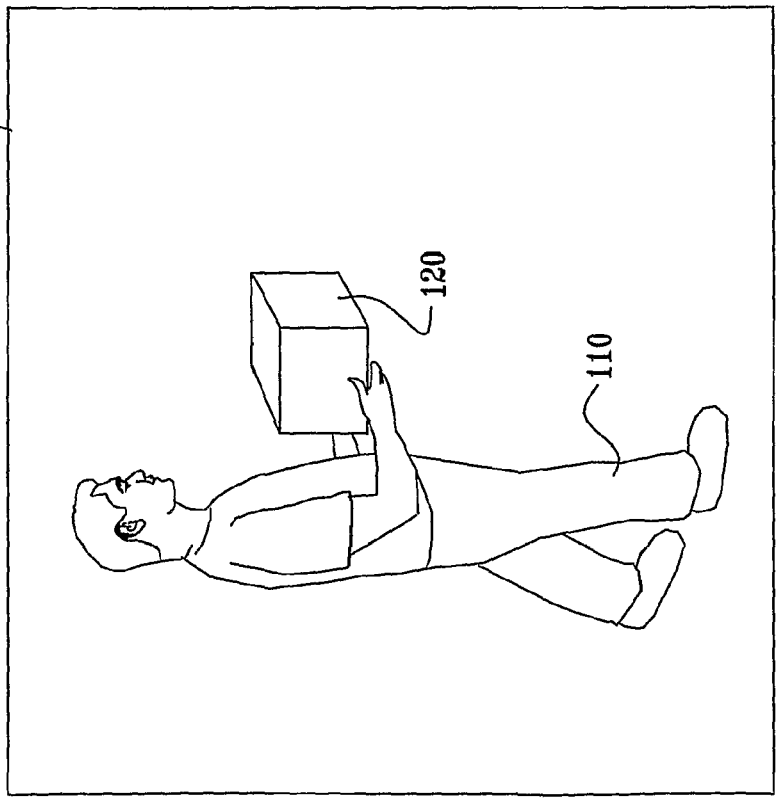

SYSTEM FOR ANALYSIS OF MOTION

The present application is a 35 USC §371 application of PCT/GB2006/001070, filed on 23 Mar. 2006 and entitled "System for Analysis of Motion", which was published on 27 Sep. 2007 in the English language with International Publication Number WO 2007/107685.

FIELD OF THE INVENTION

The present invention relates to efficient computation of a motion vector of an object imaged in a stream of video image frames.

BACKGROUND OF THE INVENTION

Real time computation of a motion vector of an object imaged in a stream of video image frames is typically performed using specialized hardware, or using software requiring intensive processing.

The prior art of motion field estimation is largely dedicated to hardware for specific applications, such as fluid metrics and target tracking. The applications typically require either expensive equipment or precise estimation. There is currently no product that implements a "lightweight" real time implementation of optical flow concepts.

A system which uses a connected camera and motion detection in order to provide interactive games, is, for example, the Sony Playstation®. The Sony product is named EyeToy™, and other variations on the name EyeToy™ such as, EyeToy: Play 2™. An example reference to Sony EyeToy™ can be found on the World Wide Web, at: www.us-.playstation.com/pressreleases.aspx?id=283.

The following references are also believed to represent the state of the art:

U.S. Pat. No. 6,658,059 to Iu et al;
U.S. Pat. No. 6,370,196 to Griessl et al;
US Published Patent Application 2005/0100207 of Konolige;
PCT Published Patent Application WO 98/03021 of SRI International;
PCT Published Patent Application WO 01/96982 of Dynapel Systems Inc.;
PCT Published Patent Application WO 05/006762 of Queen Mary & Westfield College;
EP Patent Application No. EP 0 557 007 of Sony Corporation; and
EP Patent EP 0 966 727 to GMD—Forschungszentrum Informationstechnik Gmbh.

The disclosures of all references mentioned above and throughout the present specification, as well as the disclosures of all references mentioned in those references, are hereby incorporated herein by reference.

SUMMARY OF THE INVENTION

The present invention seeks to provide an improved system and method for determining, in real time, a motion vector of an object imaged in a stream of video image frames.

The present invention, in preferred embodiments thereof, enables applications to determine in a computationally efficient manner the motion vector of an object. In order to perform the computation in real time, on a relatively weak CPU typical of set top boxes, use is made of a mixture of optical principles, pattern matching, and stochastic aspects of object motion.

The determination of the motion vector is simplified by combining, in an original way, different computational methods, converging to an estimation of the motion vector performed in real time, on low cost hardware such as a set top box with a standard processor.

A preferred embodiment of the present invention has been developed for running on a set top box entitled "PILOTIME". The "PILOTIME" set top box is commercially available from THOMSON, 46 quai Alphonse Le Gallo, 92100 Boulogne-Billancourt, France. The implementation on the PILOTIME set top box demonstrates a real time implementation of optical flow concepts on a relatively common, relatively inexpensive device.

In accordance with a preferred embodiment of the present invention, the motion vector is determined as follows:

First, a zone within a first image frame is selected, the zone preferably including a moving object. The zone is sub-divided into blocks, termed herein frame elements. The frame elements include a plurality of pixels having associated pixel values. Within each frame element, the pixel values are preferably normalized relative to each frame element, to avoid luminance variation effects in the first image frame.

It is noted that the motion vector is determined separately for each frame element of the first image. The motion vector determined for frame elements depicting the moving object will preferably be substantially equal to the motion vector of the object, while frame elements not depicting the moving object will preferably possess a motion vector of a background.

Second, one or more reference pixels are typically selected in each normalized frame element.

Third, an optical flow is computed for each of the reference pixels, producing optic flow lines and an error range about the optic flow lines. The optical flow lines and the error range define a region.

Fourth, each normalized frame element of the first image frame has a pattern matching step performed, the pattern matching being between the normalized frame element of the first image frame and normalized test frame elements of a second, typically immediately following, image frame. Displacements of the normalized test frame elements, relative to the normalized frame element of the first image frame, are preferably confined to be within the region mentioned above. The results of the pattern matching are pattern matching scores and displacement vectors, which are associated with corresponding displacements of the test frame element.

The lowest pattern matching score, which corresponds to the displacement with a best fit, is selected, and the corresponding displacement vector is used to calculate the motion vector of the object, thus determining the motion vector.

The present invention, in preferred embodiments thereof, generally uses approximations to quadratic equations in order to simplify computations.

A typical use of the present invention, in preferred embodiments thereof, is to evaluate, in real time, the motion vector of the object in a scene produced by a webcam connected to a set top box, for example, but not limited to, enhancing interactive game applications, such as Pong-Classic and Arkanoid-like games.

Preferred embodiments of the present invention enable high-end features to enrich user-STB interaction for sports, edutainment and fitness gaming applications using low-cost hardware.

The term "image" in all its grammatical forms is used throughout the present specification and claims interchangeably with the terms "image frame" and "digital image" and their corresponding grammatical forms.

There is thus provided in accordance with a preferred embodiment of the present invention a computer system for real-time determination of a motion vector of a frame element within an image frame in a stream of video image frames, the stream including at least a first image frame and a second image frame, the system including a plurality of operatively connected elements including an image stream receiver to receive the stream of image frames, an image decomposer to decompose each of the image frames into a plurality of frame elements, each of the frame elements including a plurality of pixels and a plurality of associated pixel values, an image normalizer to normalize the pixel values of the frame elements of each of the image frames thereby yielding a plurality of normalized frame elements having a plurality of associated normalized pixel values, an image processor to apply an image processing filter to one of the normalized frame elements of the first image frame, yielding a filtered frame element having a plurality of associated filtered pixel values, a pixel selector to select a first reference pixel from the filtered frame element, such that the first reference pixel has the highest value of the filtered pixel values, an optic flow module to determine a first optic flow based on an optic flow equation applied at a location of the first reference pixel, a pattern matching module to perform pattern matching between the normalized pixel values of the one normalized frame element of the first image frame, and the normalized frame elements of the second image frame, being test frame elements, yielding a plurality of pattern matching scores, each of the test frame elements having one of the pattern matching scores, wherein the pattern matching is performed such that for each one of the test frame elements, a displacement vector between a location of the one normalized frame element and a location of the one test frame element is restricted by a region which is at least partially based on the first optic flow, and a motion vector determiner to determine a motion vector at least partially based on the displacement vector associated with one of the test frame elements having a lowest one of the pattern matching scores.

Further in accordance with a preferred embodiment of the present invention the stream of video image frames is a stream of color image frames, and for each one of the pixels an associated one of the pixel values is a value of a luminosity component associated with the one pixel.

Still further in accordance with a preferred embodiment of the present invention the image processing filter is a contrast enhancing filter.

Additionally in accordance with a preferred embodiment of the present invention the contrast enhancing filter is a Sobel filter.

Moreover in accordance with a preferred embodiment of the present invention the pattern matching module computes the pattern matching score based on a sum of absolute values of differences between the normalized pixel values of the one normalized frame element and corresponding normalized pixel values of the one test frame element.

Further in accordance with a preferred embodiment of the present invention the pattern matching module defines the region as being bounded by a first line and a second line, such that the first line intersects the second line at an intersection, a third line bisects an angle between the first line and the second line, the third line is in a direction based at least partly on a direction of the first optic flow, and the third line and the first line subtend an angle epsilon.

Still further in accordance with a preferred embodiment of the present invention the pattern matching module determines the angle epsilon independently of the first optic flow.

Additionally in accordance with a preferred embodiment of the present invention the pixel selector further selects a second reference pixel from the filtered frame element, the optic flow module further determines a second optic flow based on the optic flow equation applied at a location of the second reference pixel, and the pattern matching module is operative to perform a consistency check including checking that the angular difference between the second optic flow and the third line is less than, or equal to, the angle epsilon.

Moreover in accordance with a preferred embodiment of the present invention the pixel selector further selects a second reference pixel from the filtered frame element, such that the second reference pixel has a second highest value of the filtered pixel values, and wherein the optic flow module further determines a second optic flow based on the optic flow equation applied at a location of the second reference pixel.

Further in accordance with a preferred embodiment of the present invention the pattern matching module determines the angle epsilon based on an angular difference between the first optic flow and the second optic flow.

Still further in accordance with a preferred embodiment of the present invention the pixel selector further selects a third reference pixel from the filtered frame element, such that the third reference pixel has a third highest value of the filtered pixel values, and wherein the optic flow module further determines a third optic flow based on the optic flow equation applied at a location of the third reference pixel.

Additionally in accordance with a preferred embodiment of the present invention the pattern matching module determines the angle epsilon at least partly based on a value of an angle epsilon used in determining the motion vector of a previous normalized frame element of the first image frame.

Moreover in accordance with a preferred embodiment of the present invention the pattern matching module is operative to perform a consistency check including checking that the angular difference between the third optic flow and the first optic flow is less than, or equal to, the angle epsilon.

Further in accordance with a preferred embodiment of the present invention the pattern matching module restricts the region so that a distance between the intersection and any location within the region is less than a maximum value.

Still further in accordance with a preferred embodiment of the present invention the maximum value is one quarter of a smallest dimension of an image frame.

Additionally in accordance with a preferred embodiment of the present invention includes determining the maximum value by converting from a maximum physical speed to a corresponding displacement, the converting being based at least partially on a frame rate of the stream of video image frames and at least one optical property.

Moreover in accordance with a preferred embodiment of the present invention the pattern matching module determines the maximum value based on a maximum value of a previous frame element of the first image frame and on a motion vector of the previous frame element of the first image frame.

Further in accordance with a preferred embodiment of the present invention the pattern matching module computes the distance as a sum of an absolute value of a horizontal displacement and an absolute value of a vertical displacement.

Still further in accordance with a preferred embodiment of the present invention if the lowest one of the pattern matching scores is greater than a first target score, the motion vector determiner determines the motion vector to be of zero magnitude.

Additionally in accordance with a preferred embodiment of the present invention the pattern matching module ceases pattern matching as soon as a pattern matching score is yielded which is less than a second target score.

Moreover in accordance with a preferred embodiment of the present invention the pattern matching module determines the second target score as 5% of an average of the pixel values of the one normalized frame element of the first image frame.

Further in accordance with a preferred embodiment of the present invention the displacement vector having a beginning and an end, the beginning of the display vector is at the intersection, and the pattern matching module performs a first pattern matching with a first one of the test frame elements with the end of the displacement vector at the intersection, and performs additional pattern matching with additional test frame elements by scanning the end of the displacement vector through the region.

There is also provided in accordance with another preferred embodiment of the present invention a method for real-time determination, by a processor, of a motion vector of a frame element within an image frame in a stream of video image frames, the stream including at least a first image frame and a second image frame, the method including receiving the stream of image frames, decomposing each of the image frames into a plurality of frame elements, each of the frame elements including a plurality of pixels and a plurality of associated pixel values, normalizing the pixel values of the frame elements of each of the image frames thereby yielding a plurality of normalized frame elements having a plurality of associated normalized pixel values, applying an image processing filter to one of the normalized frame elements of the first image frame, yielding a filtered frame element having a plurality of associated filtered pixel values, selecting a first reference pixel from the filtered frame element, such that the first reference pixel has the highest value of the filtered pixel values, determining a first optic flow based on an optic flow equation applied at a location of the first reference pixel, performing pattern matching between the normalized pixel values of the one normalized frame element of the first image frame, and the normalized frame elements of the second image frame, being test frame elements, yielding a plurality of pattern matching scores, each of the test frame elements having one of the pattern matching scores, wherein the pattern matching is performed such that for each one of the test frame elements, a displacement vector between a location of the one normalized frame element and a location of the one test frame element is restricted by a region which is at least partially based on the first optic flow, and determining a motion vector at least partially based on the displacement vector associated with one of the test frame elements having a lowest one of the pattern matching scores.

Further in accordance with a preferred embodiment of the present invention the pattern matching includes computing the pattern matching score based on a sum of absolute values of differences between the normalized pixel values of the one normalized frame element and corresponding normalized pixel values of the one test frame element.

Still further in accordance with a preferred embodiment of the present invention the region is bounded by a first line and a second line, the first line intersecting the second line at an intersection, a third line bisects an angle between the first line and the second line, the third line is in a direction based at least partly on a direction of the first optic flow, the third line and the first line subtend an angle epsilon.

Additionally in accordance with a preferred embodiment of the present invention includes selecting a second reference pixel from the filtered frame element, determining a second optic flow based on the optic flow equation applied at a location of the second reference pixel, and performing a consistency check including checking that the angular difference between the second optic flow and the third line is less than, or equal to, the angle epsilon.

Moreover in accordance with a preferred embodiment of the present invention includes selecting a second reference pixel from the filtered frame element, such that the second reference pixel has a second highest value of the filtered pixel values, determining a second optic flow based on the optic flow equation applied at a location of the second reference pixel, selecting a third reference pixel from the filtered frame element, such that the third reference pixel has a third highest value of the filtered pixel values, determining a third optic flow based on the optic flow equation applied at a location of the third reference pixel, and performing a consistency check, including checking that the angular difference of the third optic flow from the first optic flow is less than, or equal to, the angle epsilon.

Further in accordance with a preferred embodiment of the present invention includes restricting the region so that a distance between the intersection and any location within the region is less than a maximum value.

Still further in accordance with a preferred embodiment of the present invention includes computing the distance as a sum of an absolute value of a horizontal displacement and an absolute value of a vertical displacement.

Additionally in accordance with a preferred embodiment of the present invention includes determining the motion vector to be of zero magnitude if the lowest one of the pattern matching scores is greater than a first target score.

Moreover in accordance with a preferred embodiment of the present invention pattern matching ceases as soon as a pattern matching score is yielded which is less than a second target score.

Further in accordance with a preferred embodiment of the present invention the displacement vector having a beginning and an end, the beginning of the display vector being at the intersection, and performing a first pattern matching with a first one of the test frame elements, with the end of the displacement vector at the intersection, and additional pattern matching with additional test frame elements, by scanning the end of the displacement vector through the region.

BRIEF DESCRIPTION OF THE DRAWINGS

The present invention will be understood and appreciated more fully from the following detailed description, taken in conjunction with the drawings in which:

FIG. 2A is a simplified pictorial illustration of an image depicting a moving object;

FIG. 2B is a simplified pictorial illustration of an image depicting the moving object of FIG. 2A and a motion vector of the moving object determined by the system of FIG. 1;

DETAILED DESCRIPTION OF A PREFERRED EMBODIMENT

Figure 1:
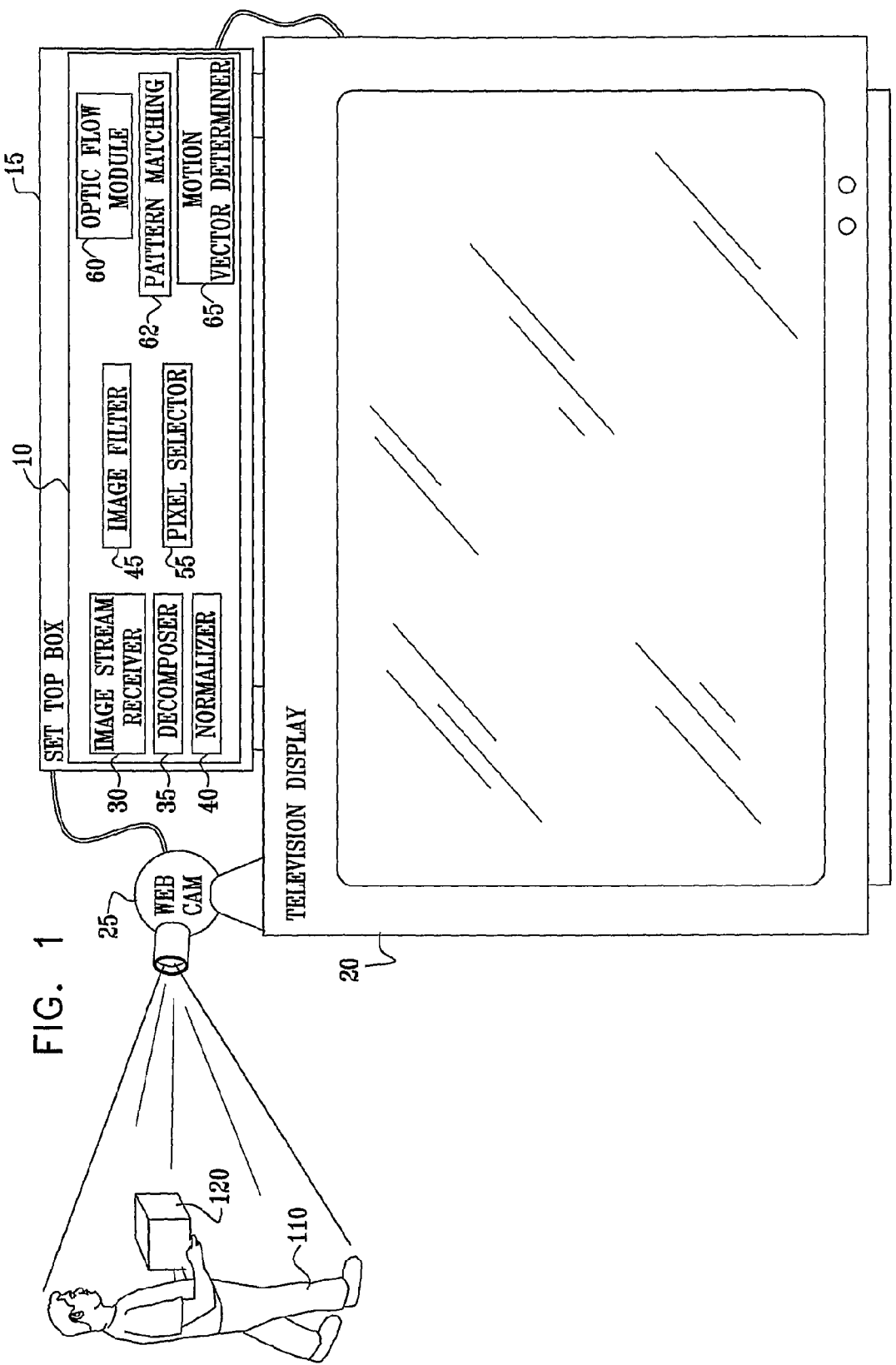
FIG. 1 is a simplified pictorial illustration of a system constructed and operative in accordance with a preferred embodiment of the present invention.

Reference is now made to FIG. 1, which is a simplified pictorial illustration of a system 10 constructed and operative in accordance with a preferred embodiment of the present invention.

FIG. 1 depicts the system 10 in a typical example setting. The system 10 is preferably implemented within a set top box 15. The set top box 15 is typically operatively connected to a video display 20, for example, but not limited to, a television display. The set top box 15 is preferably operatively connected to a webcam 25. However, it will be appreciated by those ordinarily skilled in the art that the set top box 15 can be connected to any suitable digital video source, for example, but not limited to, a broadcast, a point to point transmission of a video image frame stream, and a playback of a recording. In the example of FIG. 1, the webcam 25 is positioned to provide a stream of video image frames of a person 110 juggling a moving object 120.

The system 10 preferably includes the following functional modules:

an image stream receiver 30 preferably operative to receive a stream of video image frames from a digital video source;

an image decomposer 35 typically operative to decompose images received from the image stream receiver 30, into sub-images, also termed frame elements, of N pixels by N pixels;

a normalizer 40 generally operative to normalize the frame elements produced by the image decomposer 35, as described in more detail below with reference to FIG. 3;

an image filter 45 preferably operative to apply an image processing filter to the normalized frame elements produced by the normalizer 40, as described in more detail below with reference to FIG. 3;

a pixel selector 55 typically operative to select pixels which are reference pixels, or "locations of interest", based on filtered frame elements produced by the image filter 45, as described in more detail below with reference to FIG. 3 and FIG. 4;

an optic flow module 60 generally operative to compute optic flows for at least some of the reference pixels, selected by the pixel selector 55, as described in more detail below with reference to FIG. 3 and FIG. 5;

a pattern matching module 62 preferably operative to perform pattern matching between a normalized frame element of a first image frame and normalized test frame elements of a second image frame, producing pattern matching scores, as described below in more detail with reference to FIGS. 3, 6, 7A-7B, and 8A-8C; and a motion vector determiner 65 typically operative to determine a motion vector based on pattern matching scores from the pattern matching module 62.

Reference is now made to FIGS. 2A and 2B. FIG. 2A is a simplified pictorial illustration of an image frame 200 depicting the moving object 120. FIG. 2B is a simplified pictorial illustration of an image 230 depicting the moving object 120 of FIG. 2A and a motion vector 240 of the moving object 120 determined by the system 10 of FIG. 1.

FIG. 2A depicts the first image frame 200 of a stream of video image frames, in which the person 110 is juggling the object 120.

FIG. 2B depicts the second image frame 230, from a later location in the stream of video image frames, preferably the very next image. The position of the object 120 in FIG. 2B has moved relative to the position of the object 120 in FIG. 2A.

The motion vector 240 indicates the motion of the object 120 by depicting the displacement of the object 120 from the location of object 120 in image 200 to the location of object 120 in image 230.

In order to determine the motion vector 240 of the object 120 imaged in the stream of video image frames, the following steps are preferably performed.

A stream of video image frames is provided to the system 10 of FIG. 1.

Figure 3:
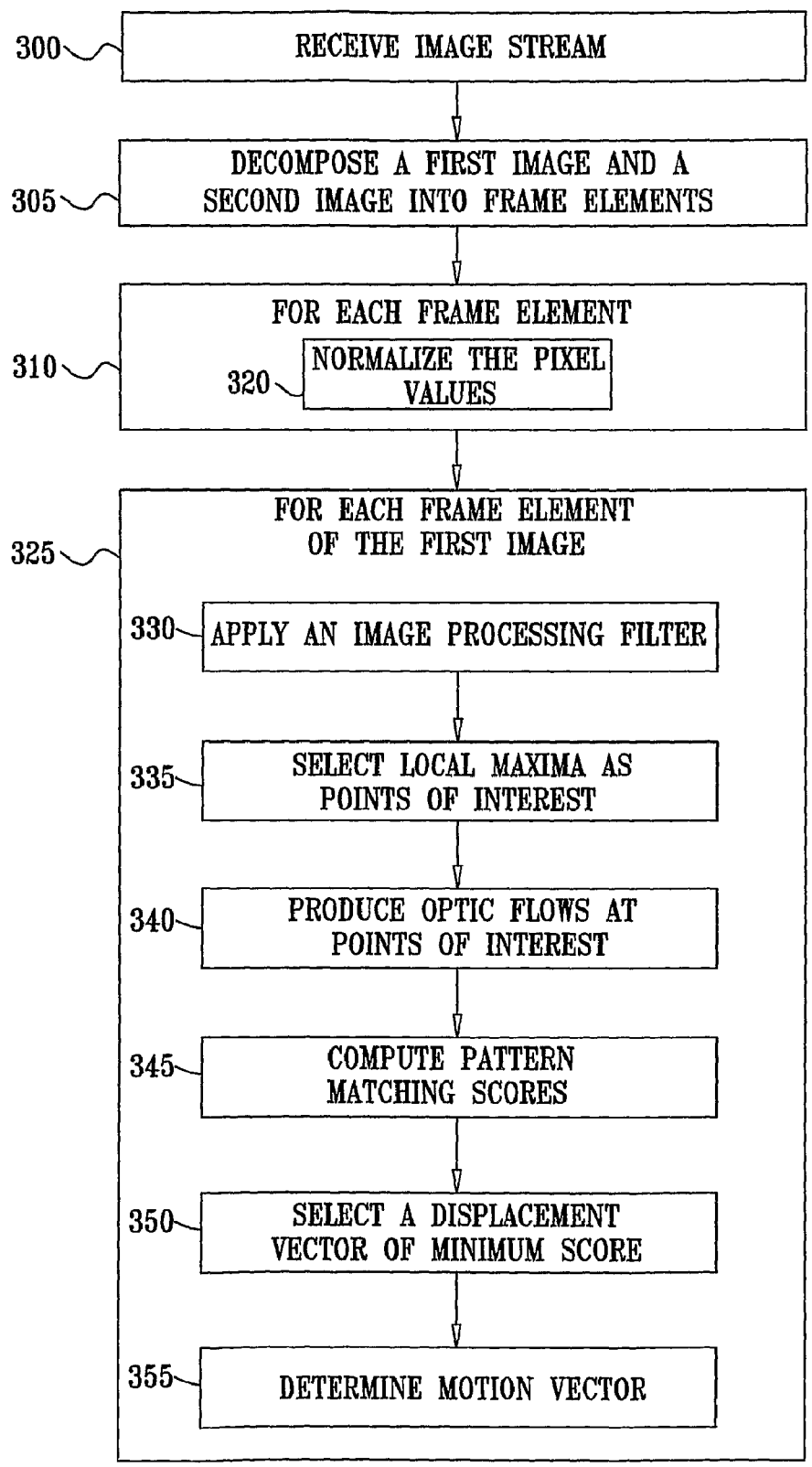
FIG. 3 is a simplified flowchart illustration of a preferred method of operation of the system of FIG. 1.

Reference is now made to FIG. 3, which is a simplified flowchart illustration of a preferred method of operation of the system 10 of FIG. 1. Reference is also made to FIG. 1.

The stream of video image frames is preferably received by the image stream receiver 30, including at least the first image frame 200 (FIG. 2A) and the second image frame 230 (FIG. 2B). The first image frame 200 and the second image frame 230 which preferably immediately follows the first image frame 200, are selected (step 300), by the image stream receiver 30.

The decomposer 35 preferably decomposes the first image frame 200 and the second image frame 230 into frame elements sized N pixels by N pixels (step 305).

The decomposer 35 preferably decomposes only zones of interest within the first image frame 200 and within the second image frame 230, in order not to perform unnecessary processing on an entire image in cases where a partial image would suffice. The zones of interest are typically application specific. By way of a non-limiting example, for a Pong-Classic game, the system 10 typically only searches for movement near two opposite edges of the first image frame 200 and the second image frame 230, thereby necessitating decomposing the first image frame 200 and the second image frame 230 near two opposite edges.

Each frame element of the images is defined by an N by N square matrix. For example, the p-th frame element is defined as:

$$Element_p = \begin{pmatrix} I_{1,1} & I_{1,2} & \cdots & I_{1,n} \\ I_{2,1} & \ddots & & \vdots \\ \vdots & & \ddots & \vdots \\ I_{n,1} & \cdots & \cdots & I_{n,n} \end{pmatrix} \quad \text{(Equation 1)}$$

wherein Ix,y is a value of a single pixel of an image, at frame element coordinates (x, y). The value of a pixel is described below.

Each frame element of the first image frame 200 and each frame element of the second image frame 230 is now typically processed independently of other frame elements (step 310). Normalization is preferably performed to avoid luminance variation effects in the image, for example, but not limited to, shadow, lighting, and/or noise. A normalized frame element is produced by dividing each pixel value by a normalization factor specific to the frame element being processed (step 320). The normalization factor $\|Norm_p\|$ of the p-th frame element is preferably defined by Equation 2 below:

$$\|Norm_p\| = \frac{1}{n^2}\sum_{x=1}^{n}\sum_{y=1}^{n} I_{x,y} \quad \text{(Equation 2)}$$

For gray scale images, the pixel value of a single pixel is typically a single value of luminosity, within a range from black to white, as is well known in the art.

For color images, each pixel typically comprises a set of three values. The three values typically define the pixel color and additional pixel properties, using various color spaces, such as, for example, and without limiting the generality of the foregoing, the red, green, blue (RGB) color space; and the hue, luminance, saturation color space. For color images, the three values of a color pixel are preferably transformed to a color space comprising luminance, if needed. Then the luminance value is used as the pixel value.

A motion vector of an object is preferably determined separately for each frame element in the image 200 (step 325). In cases where an object is larger than a frame element, the object is typically associated with a plurality of motion vectors, each of the motion vectors preferably being uniquely associated with a frame element. In case where the object is smaller than a frame element, only one frame element typically yields a motion vector corresponding to the motion of the object, while other frame elements typically do not yield motion vectors of any significant motion for the object, or yield motion vectors corresponding to the movement of other objects.

The size of a frame element is typically application specific, generally depending on one or more of the following: the resolution of the digital video source, the magnitude of the object and the size of the image frame. By way of a non-limiting example, for a VGA frame (640 pixels by 480 pixels) the size of each of the frame elements is 8 pixels by 8 pixels, and for a High Definition TV (HDTV) frame, the size of each of the frame elements is 16 pixels by 16 pixels.

After normalization, a contrast enhancing filter, preferably a Sobel filter, is typically applied to each of the normalized frame elements of the first image frame 200 (step 330), producing filtered normalized frame elements of the first image frame 200. It will be appreciated by those ordinarily skilled in the art that any suitable contrast enhancing filter can be used, for example, but not limited to, a high-pass filter, and a deviation filter.

The p-th filtered normalized frame element $S_p$ of the normalized frame element p is determined using the following equation:

$$S_P = \text{NormalizedElement}_p \bullet F_{sobel} \quad \text{(Equation 3)},$$

where the operands $\text{NormalizedElement}_p$ and $F_{sobel}$ are the p-th normalized frame element of the image and the Sobel filter, respectively, and the • operator denotes the operation of applying a filter to a frame element, as is well known in the art.

By way of a non-limiting example, the Sobel filter used in a preferred embodiment of the present invention is:

$$F_{sobel} = \begin{pmatrix} -1/\sqrt{2} & -1 & -1/\sqrt{2} \\ -1 & 4(1+1/\sqrt{2}) & -1 \\ -1/\sqrt{2} & -1 & -1/\sqrt{2} \end{pmatrix} \quad \text{(Equation 4)}$$

Further expansion of Equation 3 and Equation 4 provides:

$$S(x,y)=4(1+1/\sqrt{2})I'(x,y)-I'(x-1,y)-I'(x+1,y)-I'(x,y+1)-I'(x,y-1)-1/\sqrt{2}(I'(x+1,y+1)+I'(x-1,y-1)+I'(x-1,y+1)+I'(x+1,y-1)) \quad \text{(Equation 5)}$$

wherein the I'(x,y) are the normalized values of pixels at coordinates (x, y) in the normalized frame elements of the first image frame 200.

Within each one of the filtered normalized frame elements of the first image frame 200, locations of local maxima of filtered pixel values are preferably selected (step 335), producing locations of selected pixels, referred to as "reference pixels". The step 335 of FIG. 3 is now described in more detail with reference to FIG. 4.

Figure 4:
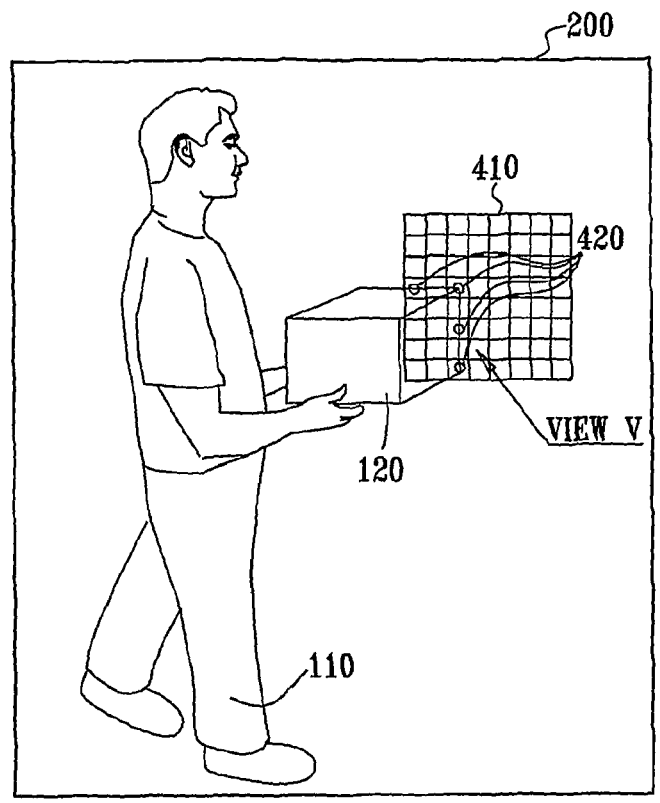
FIG. 4 is a simplified pictorial illustration of a plurality of reference pixels selected by the system of FIG. 1.

Reference is now made to FIG. 4 which is a simplified pictorial illustration of a plurality of reference pixels 420 selected by the system 10 of FIG. 1.

FIG. 4 depicts the first image frame 200 of FIG. 2A, and within the first image frame 200, a frame element 410. The frame element 410 is depicted as having a size of 8 pixels by 8 pixels. Within the frame element 410 several reference pixels 420 are depicted. The reference pixels 420 are located at locations of pixels which comprise local maxima of the filtered normalized pixel values. The reference pixels 420 are typically located at locations of high contrast within the frame element 410.

The pixel selector 55 (FIG. 1) preferably selects three of the reference pixels 420, having the three highest pixel values of the filtered normalized frame element. However, in accordance with alternative preferred embodiments of the present invention, one or more reference pixels 420 can be used, as will be described below with reference to FIGS. 7A and 7B.

Figure 5:
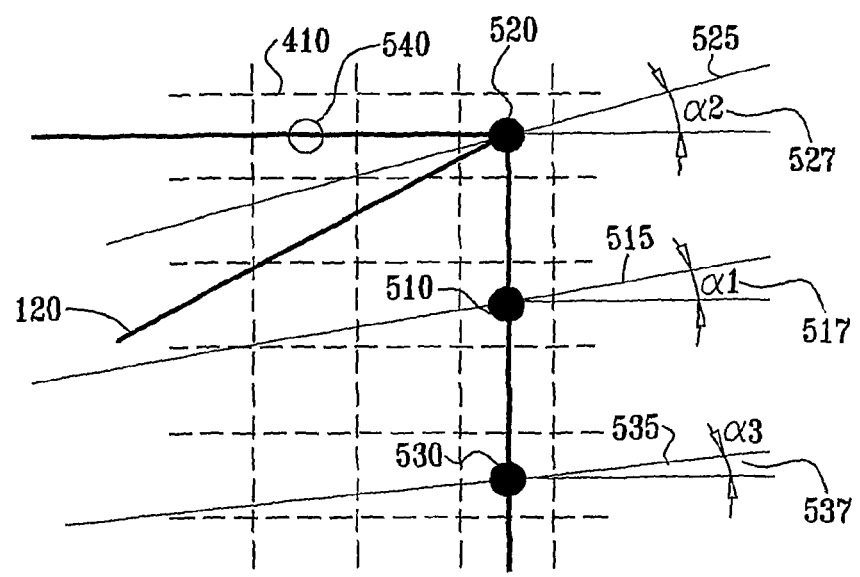
FIG. 5 is a simplified pictorial illustration of a plurality of optic flow lines produced by the system of FIG. 1.

Reference is now made to FIG. 5, which is a simplified pictorial illustration of a plurality of optic flow lines produced by the system 10 of FIG. 1. Reference is also made to FIG. 3. FIG. 5 is an enlarged view of the region marked View V of FIG. 4.

FIG. 5 depicts the frame element 410, which includes a first reference pixel 510, a second reference pixel 520, a third reference pixel 530, and an additional reference pixel 540.

Three of the reference pixels, namely the reference pixels 510, 520, 530 have the three highest filtered normalized pixel values in the frame element 410. The first reference pixel 510 has the highest filtered normalized pixel value. The second reference pixel 520 has the second highest filtered normalized pixel value. The third reference pixel 530 has the third highest filtered normalized pixel value. The additional reference pixel 540 also has a filtered normalized pixel value which is a local maximum, as do the reference pixels 510, 520 and 530. The additional reference pixel 540 exemplifies that there can be more than three reference pixels in the filtered normalized frame element 410.

The optic flow module 60 preferably produces optic flows 515, 525, 535, for the selected reference pixels 510, 525, 530, by applying the optic flow equation (Equation 6 below) at the location of each of the reference pixels 510, 520, 530 respectively (step 340 of FIG. 3). A more detailed description of how the optic flow module 60 produces the optic flows 515, 525, 535 is provided below with reference to Equation 6. The optic flow 515, the optic flow 525 and the optic flow 535 subtend an angle $\alpha_1$ 517, an angle $\alpha_2$ 527 and an angle $\alpha_3$ 537, respectively, with a horizontal reference direction.

The optic flow equation preferably used by the optic flow module 60 (FIG. 1) is given below:

$$\frac{dI'(xi, yi)}{dt} = 0 \Leftrightarrow$$

$$\frac{\partial I'(xi, yi)}{\partial t} + \frac{\partial I'(xi, yi)}{\partial x} \cdot \frac{\partial x}{\partial t} + \frac{\partial I'(xi, yi)}{\partial y} \cdot \frac{\partial y}{\partial t} = 0,$$

(Equation 6)

wherein I'(xi,yi) is a normalized value of a pixel of an image at coordinates (x, y) of location i in the image.

It is to be appreciated that the formula above is most accurate when ∂t, ∂x, and ∂y are small. In the case of a stream of video image frames, for example: ∂t is generally considered to be small when ∂t is substantially equal to a time interval between consecutive image frames; and ∂x and ∂y are generally considered to be small when ∂x and ∂y are substantially equal to a size of one pixel.

The terms ∂x/∂t and ∂y/∂t of the equation 6, represent an x component $V_x$ and a y component $V_y$ of a motion vector V, respectively.

The equation 6 is preferably simplified by defining the time difference between the first image frame 200 and the second image frame 230 as one unit of time, such that ∂t=1.

Substituting $V_x$ and $V_y$, as well as ∂t=1 into the equation 6 gives an equation of a straight line, as follows:

$$V_y(i) = a(i)V_x(i) + b(i)$$

(Equation 7)

wherein a(i) and b(i) are slope and intercept coefficients, respectively, of a straight line, produced by the optic flow equation 7 applied to the image at a location i.

It is to be appreciated that Equation 7 is an equation with two unknowns, $V_x$ and $V_y$.

Equation 7 is now solved separately for a(i) and for b(i):

$$b(i) = \frac{I'_1(xi, yi) - I'_2(xi, yi)}{I'_2(xi, yi) - I'_2(xi, yi-1)}$$

(Equation 8)

$$a(i) = \frac{I'_2(xi, yi) - I'_2(xi+1, yi)}{I'_2(xi, yi+1) - I'_2(xi, yi)}$$

(Equation 9)

wherein I'$_1$(xi,yi) is preferably a normalized value of a pixel of the first image at coordinates (xi,yi); I'$_2$(xi,yi) is preferably a normalized value of a pixel of the second image frame at coordinates (xi,yi); and I'$_2$(xi,yi−1) is preferably a normalized value of a pixel of the second image frame at coordinates (xi,yi−1), that is, a location having a y coordinate one less than the y coordinate of I'$_2$(xi,yi). It will be appreciated by those ordinarily skilled in the art that the other terms of equations 8 and 9 are defined in substantially the same way with suitable modifications with respect to the coordinate values.

By way of a non-limiting example, I'$_1$(xi,yi) is preferably a normalized value of the first reference pixel 510 of the first image frame 200, I'$_2$(xi,yi) is preferably a normalized value of a pixel of the second image frame 230, which is located at the location of the first reference pixel 510, I'$_2$(xi,yi−1) is preferably a normalized value of a pixel of the second image frame 230, which is located below of the first reference pixel 510, and so forth. It will be appreciated by those ordinarily skilled in the art that the other terms of equations 8 and 9 are exemplified in substantially the same way with suitable modifications with respect to the coordinate values.

Therefore, optic flow lines 515, 525, 535, are each preferably produced by applying Equation 8 and Equation 9 to the normalized frame element 410 of the first image frame 200 at the reference pixels 510, 520, 530, respectively, thereby determining a(i) and b(i) for each of the reference pixels 510, 520, 530. The calculated values a(i) and b(i) are preferably substituted into Equation 7 for each of the reference pixels 510, 520, 530, in order to determine the optic flow lines 515, 525, 535, respectively.

It should be noted that equations 7-9, used to determine the slope a(i) and intercept b(i) of the optic flows 515, 525, 535, define a straight line for each of the reference pixels 510, 520, 530. However, the magnitude of the optic flows 510, 520, 530 is not typically known.

Therefore, in general, the optic flow lines are only typically limited by the edges of the image frames.

Figure 6:
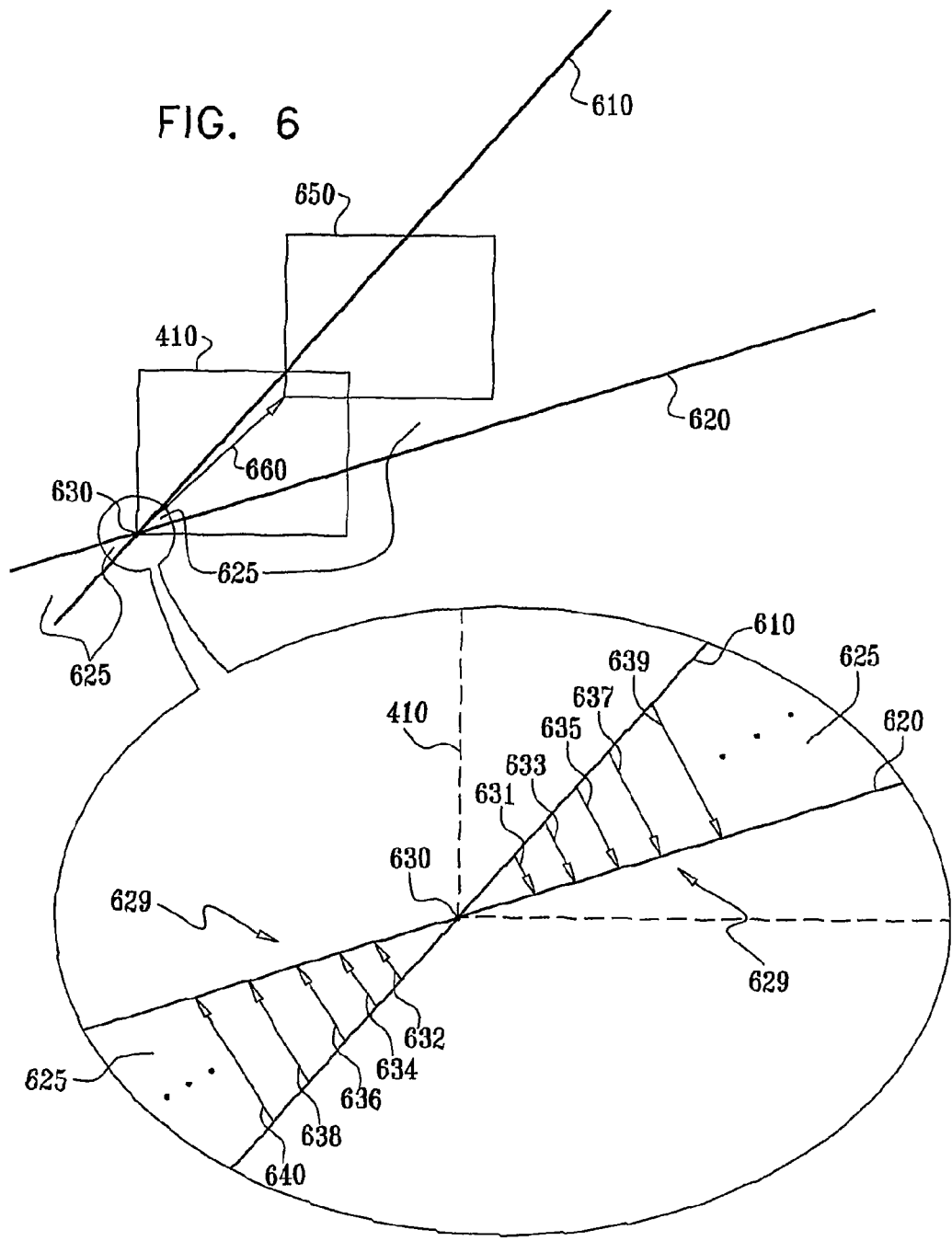
FIG. 6 is a simplified pictorial illustration of a normalized frame element of a first image frame, a displaced normalized test frame element of a second image frame, and a scanning pattern for displacements used by the system of FIG. 1.

Reference is now made to FIG. 6, which is a simplified pictorial illustration of the normalized frame element 410 of the first image frame 200, a displaced normalized test frame element 650 of the second image frame 230 (FIG. 2B), and a scanning pattern 629 for displacements used by the system 10 of FIG. 1. Reference is also made to FIGS. 1 and 3.

By way of introduction, the pattern matching module 62 preferably performs pattern matching between the normalized frame element 410 of the first image frame 200 and normalized test frame elements 650 of the second image frame 230. Therefore, the pattern matching module 62 preferably instructs:

the decomposer 35 to produce test frame elements of the second image frame 230; and the normalizer 40 to normalize the test frame elements, producing normalized test frame elements 650 of the second image frame 230 at various displacements relative to the frame element 410 of the first image frame 200, as needed during pattern matching.

The displacements are preferably incremented by one pixel at a time. One such displacement, by way of a non-limiting example, is depicted by a displacement vector 660, which extends from the location of the frame element 410 of the first image frame 200, to the location of the normalized test frame element 650 of the second image frame 230.

Efficiency is preferably gained by performing the pattern matching only in a region 625 where a good match is expected, thereby reducing unnecessary computation. Determining the region 625 is described in more detail below with reference to FIGS. 6, 7A and 7B.

FIG. 6 depicts the normalized frame element 410, and two lines, a first line 610 and a second line 620, intersecting at an intersection 630. The displacements mentioned above are typically measured as displacements from the intersection 630. The method of determining the first line 610 and the second line 620 is described in more detail below with reference to FIGS. 7A and 7B.

It is to be appreciated that the location of the frame element 410 and the location of the test frame element 650 are typically defined with respect to a predetermined pixel within the frame elements. The fixed pixel is preferably a specific corner, the corner being the same corner in both frame elements. The intersection 630 is preferably located at the location of the normalized frame element 410.

The pattern matching module 62 performs pattern matching between the test frame element 650 and the frame element 410, as described in more detail below with reference to Equation 15, producing a pattern matching score (step 345 of FIG. 3).

FIG. 6 additionally depicts vectors, which are directed line segments, drawn between the first line 610 and the second line 620. The vectors describe the scanning pattern 629 in which the test frame elements 650 are typically displaced from the intersection 630. The pattern matching module 62 (FIG. 1) begins scanning at a displacement of zero, corresponding to the intersection 630. The pattern matching module typically continues scanning by changing the displacement by one pixel increments along vector 631, then along vector 632, then along vector 633, then along vector 634, and so forth, until a stop condition has been reached. The stop condition generally comprises one of: a good enough match has been achieved; and the entire region 625 has been scanned. The stop condition is described in more detail below with reference to FIGS. 8A-8C.

The pattern matching module 62 typically instructs the image decomposer 35 to produce the test frame element 650 of the second image frame 230 at each displacement in the scanning pattern. The pattern matching module 62 also typically instructs the normalizer 40 to normalize the test frame elements 650, producing normalized test frame elements 650. The pattern matching module 62 then performs pattern matching, as described in greater detail with reference to FIGS. 8A-8C below. The pattern matching module 62 produces a pattern matching score and associates the pattern matching score with the displacement vector 660 corresponding to the displacement of the test frame element 650.

In accordance with a most preferred embodiment of the present invention, in addition to scanning in the region 625 confined between two lines, a limit is also imposed on what distance from the intersection 630 the region 625 may extend. The limit (or maximum value of the distance) is, at least initially, typically, a distance of one quarter of an image frame. Since image frames are typically rectangular, the limit is generally a distance of one quarter of a smaller dimension of an image frame.

In accordance with the most preferred embodiment of the present invention, when a motion vector is determined for a prior video image frame, the pattern matching module 62 typically records a value of the displacement vector 660 associated with the motion vector. When a subsequent determination, using the first image frame 200 and the second image frame 230, both taken from later in the stream of video image frames, is performed, the limit is generally twice the previously recorded value of the displacement vector.

It is to be appreciated that limiting the region 625 greatly saves computation.

In accordance with another preferred embodiment of the present invention, scanning is limited to a distance preferably based on: a scanning limit used for a previous frame element of the first image frame 200; and on a displacement corresponding to the motion vector determined for the previous frame element. The scanning limit is thus adaptable, based on a previous scanning limit, and modified by an actual distance to a previous "best-fit" test frame.

One non-limiting example of how the scanning is limited as described above is:

$$L_p = \frac{(L_{p-1} + D_{p-1})}{2} * 1.2,$$

where: $L_p$ is a scanning limit for frame element p; $L_{p-1}$ is a scanning limit from an immediately previous frame element p−1; and $D_{p-1}$ is a displacement corresponding to the motion vector determined for frame element p−1. Typical scanning limits and displacements are:

| p | 1 | 2 | 3 | 4 | 5 | 6 | 7 |
|---|---|---|---|---|---|---|---|
| $L_p$ [pixels] | 100 (an initial value) | 63 | 41 | 31 | 28 | 32 | 34 |
| $D_{p-1}$ [pixels] | 5 |   | 5 | 10 | 15 | 25 | 25 | 25 |

It is to be appreciated that for p=1, which corresponds to a first frame element, an initial value is chosen as the scanning limit $L_1$. The typical scanning limits show that even while the displacement varies (from 5 pixels to 25 pixels), the scanning limit converges rapidly to a value close to the displacement. Thus the scanning limit provides a great saving in computation, while maintaining a region large enough to determine the displacement.

D is preferably determined as described below.

Preferably, an optimization is used to calculate the distance D. Since the displacement of the test frame element 650 needs to be calculated and compared to the scanning limit, optimizing the calculation of the distance D is typically beneficial. The distance D between two pixels, $p_1$ and $p_2$, in the image frame is preferably calculated as $D=|x_1-x_2|+|y_1-y_2|$, where $x_1$ is the x-coordinate of pixel $p_1$; $x_2$ is the x-coordinate of pixel $p_2$; $y_1$ is the y-coordinate of pixel $p_1$; and $y_2$ is the y-coordinate of pixel $p_2$.

In accordance with an alternative preferred embodiment of the present invention the distance D is calculated as:

$$D=\sqrt{(x_1-x_2)^2+(y_1-y_2)^2}.$$

The optimization of the preferred method of calculating the distance D greatly cuts down computing load, as operations of computing an absolute value and adding are less computation intensive than operations of multiplying and computing a square root.

It is to be appreciated that for every displacement vector there exists a corresponding motion vector. Since displacement divided by time equals velocity, dividing the displacement vector 660 by the time between the first image frame 200 and the second image frame 230, ∂t, produces a motion vector, whose units are pixels per unit of time. The motion vector is generally an expression of actual movement of the object in a real world, and is subject to physical constraints. The magnitude of the motion vector, which corresponds to velocity, is typically required to be within a range of physically possible velocities.

Equation 10 below defines a typical magnitude constraint for motion vectors:

$$\sqrt{V_x^2+V_y^2} \leq V_{max} \qquad \text{(Equation 10)}$$

wherein Vmax is a practical upper limit to the motion vector, specific to each application. Typically, Vmax corresponds to the maximum physically possible velocity mentioned above. For example, the maximum physically possible velocity on an application intended for use in a tennis game, is typically the maximum velocity of a tennis ball in a tennis game. Alternatively, Vmax may correspond to a velocity equal to a displacement of one quarter frame in one inter-frame time period.

By way of a non-limiting example, typical motion vectors measured by a system imaging at VGA resolution, at a rate of 20 frames per second, of someone juggling objects at a distance of approximately 4 meters from a webcam, are measured to be approximately 10 pixels per 1/20 second.

It is well known in the art to convert from physical speed Vmax to a maximum value of a motion vector, based on optical properties such as a type of camera lens and distance of an object from the camera lens, and to convert from the maximum value of the motion vector to a displacement based on a frame rate of the stream of video image frames. Therefore, the scanning limit (or maximum value of the distance for scanning) is preferably determined by converting from a maximum physical speed to a corresponding displacement, wherein the converting is typically based on a frame rate of the stream of video image frames and optical properties of the webcam 25.

It is also well-known in the art, given a frame rate of a stream of video image frames, to determine a displacement vector from a corresponding motion vector, and vice versa.

In accordance with a preferred embodiment of the present invention, the scoring process is generally optimized by invalidating displacement vectors which fail the constraint of Equation 10 above.

Figure 7A:
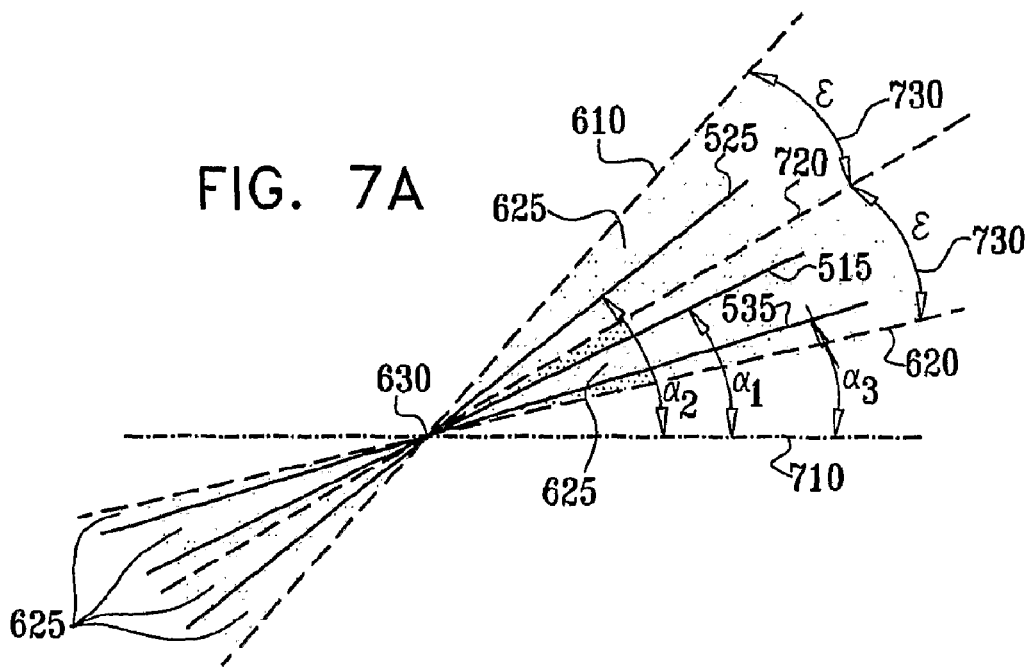
FIGS. 7A and 7B are simplified pictorial illustrations of lines used in restricting a scanning pattern used by the system of FIG. 1.
Figure 7B:
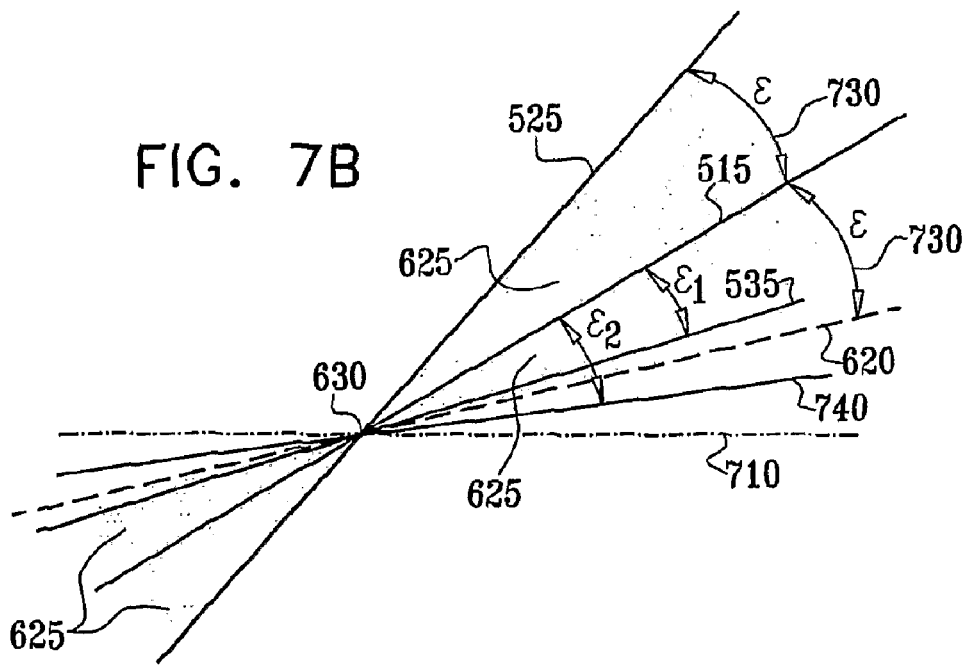

Reference is now made to FIGS. 7A and 7B, which are simplified pictorial illustrations of lines used in restricting a scanning pattern used by the system 10 of FIG. 1. Reference is also made to FIG. 1 and to FIG. 5.

FIG. 7A depicts the first line 610 and the second line 620, and the intersection 630. As described with reference to FIG. 6, the first line 610 and the second line 620 define the region 625 within which pattern matching is performed. FIG. 7A also depicts a third line 720 which bisects the angle between the first line 610 and the second line 620, producing an angle ε 730 between the first line 610 and the third line 720, and the angle ε 730 between the second line 620 and the third line 720. FIG. 7A additionally depicts the first optic flow line 515, the second optic flow line 525, and the third optic flow line 535, drawn through the intersection 630, and corresponding angles $\alpha_1$ 517, $\alpha_2$ 527 and $\alpha_3$ 537, measured from a horizontal reference line 710.

Therefore, the region 625 is determined from the third line 720, the angle ε 730, and the location of the intersection 630 such that the first line 610 and the second line 620 pass through the intersection 630 and each of the lines 610, 620 are displaced from the third line 720 by the angle ε 730.

The pattern matching module 62 preferably: computes the third line 720 to be the average of the three optic flow lines 515, 525, and 535; determines the angle ε 730 as a measure of variability of the optic flow lines 515, 525, 535 about the direction of the third line 720; and determines the location of the intersection 630 as corresponding to zero displacement from the location of the frame element 410.

Determining the measure of variability is now described below.

It is to be appreciated that the a(i) and the b(i) (calculated by Equations 9 and 8), being empirical results, comprise some variability, caused, among other causes, by digitizing errors and by artifacts within the first image frame 200 and the second image frame 230. Therefore, in accordance with a most preferred embodiment of the present invention, a set-up step is used to perform a measure of variability. A user, imaged by the webcam 25 operatively connected to the system 10, is instructed to perform movements. The system 10 goes through the process of determining a motion vector, during which the optic flow module 60 produces optic flow lines, and the pattern matching module 62 determines the variability between the optic flow lines, and uses the variability to determine the angle ε.

Alternatively, if a measurement of variability is not performed within the set-up step, default values are used for the variability of both a and b. The default values for the variability of a and b are shown below, in Equations 11 and 12.

$$\text{variability of } a = \pm \frac{1}{n}\sqrt{\sum_{i=1}^{n}(a_i - \bar{a})^2} \quad \text{(Equation 11)}$$

$$\text{variability of } b = \pm \frac{1}{n}\sqrt{\sum_{i=1}^{n}(b_i - \bar{b})^2} \quad \text{(Equation 12)}$$

wherein $a_i$ and $b_i$ are the a and b components of an i-th optic flow line, and $\bar{a}$ and $\bar{b}$ are the mean a and b components of n optic flow lines, and n is the number of optic flow lines included in the calculation. Variability is typically measured among the three optic flow lines 515, 525, and 535.

In an alternative preferred embodiment of the present invention, an optimization is preferably used to calculate the variability, as shown below, in Equation 13 and 14.

$$\text{variability of } a = \pm \frac{1}{n}\sum_{i=1}^{n}|a_i - \bar{a}| \quad \text{(Equation 13)}$$

$$\text{variability of } b = \pm \frac{1}{n}\sum_{i=1}^{n}|b_i - \bar{b}| \quad \text{(Equation 14)}$$

wherein the variables are defined as in Equations 11 and 12.

By way of example only, empirical results show that at a frame rate of 20-25 image frames per second, someone juggling objects at a distance of approximately 4 meters from an imaging video camera, the variability of b is typically ±10°. The variability is typically inversely proportional to the frame rate.

Default values for variability are likely to change according to specific applications. For example, and without limiting the generality of the foregoing, in applications in which the motion vector is expected to have only a vertical component, such as Pong-Classic, the third line 720 is preferably defined as having a zero horizontal component and no variability is typically taken into account in the horizontal direction.

Reference is now made to FIG. 7B. In accordance with another preferred embodiment of the present invention, the pattern matching module 62 defines the region 625, as follows:

the second optic flow line 525 defines one border of the region 625;

the first optic flow line 515 bisects the region 625 (FIG. 6);

the angle ε 730 is defined as the angle between the first optic flow line 515 and the second optic flow line 525; and the second line 620 is defined to be at the angle ε 730 from the first optic flow line 515, on the side opposite to the second optic flow line 525. The second line 620 thus defines a second border of the region 625.

Optionally, a consistency check is performed by the pattern matching module 62 comparing an angle $\epsilon_1$ between the third optic flow line 535 and the first optic flow line 515 to the angle ε. If the angle $\epsilon_1$ is smaller than or equal to the angle ε 730, then the pattern matching module 62 generally determines that the optic flow lines are consistent. If the third optic flow line happens to be at an angle $\epsilon_2$ which is greater than the angle ε 730, as depicted by the angle $\epsilon_2$ to a lower line 740, then the pattern matching module 62 generally determines that optic flow lines are not consistent.

It will be appreciated by those ordinarily skilled in the art that the above consistency check can be performed on the region 625 described with reference to FIG. 7A. By way of a non-limiting example, the pattern matching module compares an angle subtended by at least one of the optic flow lines 515, 525, and 535 with the third line 720, and if the angle subtended is greater than the angle ϵ then the pattern matching module 62 generally determines that optic flow lines are not consistent.

Figure 8C:
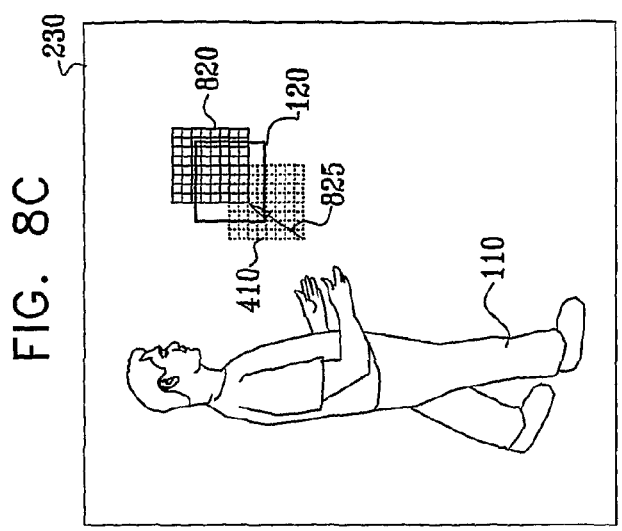
FIGS. 8A-8C are simplified pictorial illustrations of pattern matching, at different displacements, performed by the system of FIG. 1.
Figure 8B:
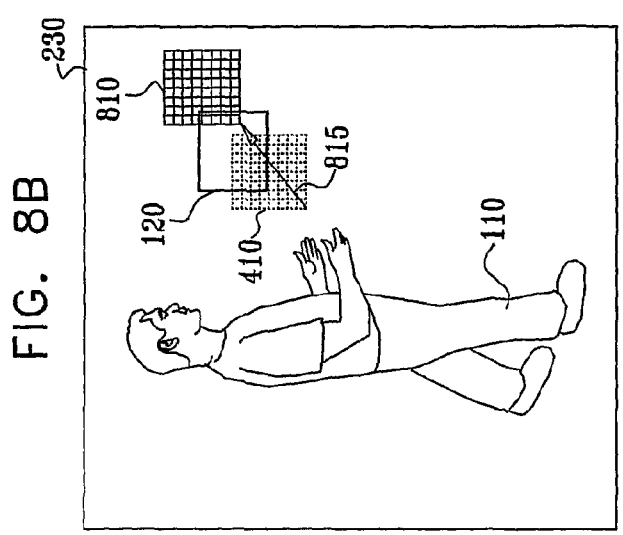
Figure 8A:
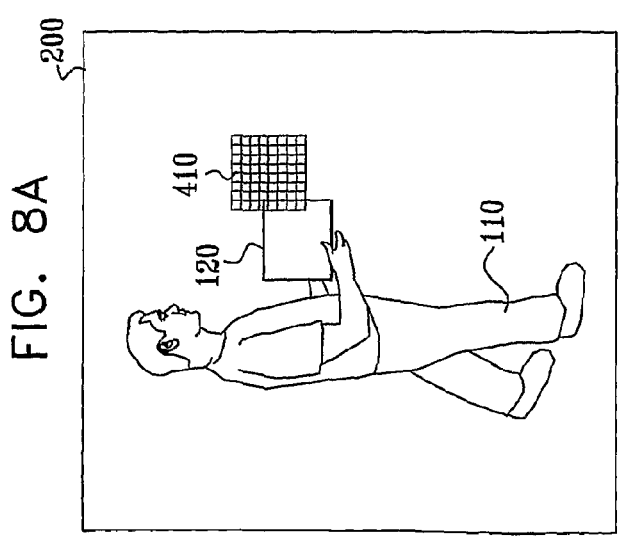

Reference is now made to FIGS. 8A-8C, which are simplified pictorial illustrations of pattern matching, at different displacements, performed by the system 10 of FIG. 1. Reference is also made to FIG. 1, FIG. 2, and FIG. 3.

FIG. 8A depicts the person 110, the object 120, and the frame element 410 containing part of the object 120, in the first image frame 200.

FIG. 8B depicts the person 110 and the object 120 in the second image frame 230. The object 120 of FIG. 8B is located at a different location within the second image frame 230 than the location of the object 120 within the first image frame 200 of FIG. 8A. FIG. 8B depicts the location of the frame element 410 of FIG. 8A and a test frame element 810 located at a location displaced by a displacement vector 815 from the frame element 410.

It is to be appreciated that the pattern matching score, produced by the pattern matching module 62, is a measure of how well the test frame element 810, displaced by the displacement vector 815, fits the underlying image 230.

The pattern matching score is preferably calculated based on a sum of squares of differences between the normalized pixel values of the first frame element 410 and corresponding normalized pixel values of the test frame element 810, typically using Equation 15:

The notation used for Equation 16 is the same as the notation used for Equation 15.

The pattern matching score is generally inversely proportional to a degree of similarity between the normalized frame element 410 of the first image frame 200 and the normalized test frame element 810 of the second image frame 230. The lower the pattern matching score is, the more similar the normalized frame element 410 in the first image frame 200 is to the normalized test frame element 810 in the second image frame 230. In FIG. 8B the object 120 is partially within the test frame element 810. Additionally, in FIG. 8B, the object 120 is located in a similar fashion with respect to the test frame element 810 as the object 120 of FIG. 8A is located with respect to the frame element 410 of FIG. 8A. Therefore, similarity is high between the normalized frame element 410 and the normalized test frame element 810, and the pattern matching module 62 preferably produces a low score.

FIG. 8C depicts the person 110 and the object 120 in the second image frame 230. The object 120 of FIG. 8C is located at the same image coordinates as the object 120 of FIG. 8B. FIG. 8C depicts the location of the frame element 410 of FIG. 8A, and a test frame element 820 at a location displaced by a displacement vector 825 from a location of the frame element 410. In FIG. 8C the object 120 is within the test frame element 810, but located quite differently from the object 120 in the frame element 410 of FIG. 8A. Similarity is low, and the pattern matching module 62 (FIG. 1) typically produces a high score.

$$Score_p(Vx, Vy) = \sum_{x=1}^{n}\sum_{y=1}^{n}\left(\left(I'_{1p}(x, y) - \|Norm_{1p}\|\right) - \left(I'_{2p}(x + Vx, y + Vy) - \|Norm_{2p}(x + Vx, y + Vy)\|\right)\right)^2.$$

(Equation 15)

In Equation 15 the following notation is used:

Vx and Vy are the x and y components of the displacement vector 815;

$\|Norm_{2p}(x+Vx,y+Vy)\|$ is a normalization factor (Equation 2) for frame element p, being the test frame element 810 of the second image frame 230, wherein the test frame element 810 is displaced by Vx in the x-direction and by Vy in the y-direction, relative to the first frame element 410;

$I'_{2p}(x+Vx,y+Vy)$ is a pixel value at coordinates x+Vx, y+Vy of the test frame element 810 of the second image frame 230;

$\|Norm_{1p}\|$ is the normalization factor (Equation 2) for frame element p of the frame element 410 of the first image frame 200; and $I'_{1p}(x, y)$ is the pixel value at coordinates x, y of the frame element 410 of the first image frame 200.

In accordance with another preferred embodiment of the present invention the pattern matching score is preferably calculated based on a sum of absolute values of differences between the normalized pixel values of the first frame element 410 and corresponding normalized pixel values of the test frame element 810, typically using Equation 16:

In the example of FIGS. 8A-8C, it is to be appreciated that the score which the displacement vector 825 of FIG. 8C receives is higher than the score which displacement vector 815 of FIG. 8B receives, because the displaced test frame element 820 does not fit the image 230 as well as the displaced test frame element 810.

Once pattern matching scores corresponding to displacements of test frame elements have been computed, the pattern matching module 62 preferably selects a displacement vector 815 having a lowest pattern matching score (step 350 of FIG. 3). The motion vector determiner 65 then determines the motion vector based on the displacement vector 815, by dividing the displacement vector 815 by the time between the first image frame 200 and the second image frame 230 (step 355).

The motion vector determiner 65 preferably determines the motion vector to be of zero magnitude if the pattern matching module produces pattern matching scores which are all greater than a first target score. The first target score is typically equal to 15% of an average of the normalized pixel values of the first frame element 410 of the first image frame 200.

$$Score_p(Vx, Vy) = \sum_{x=1}^{n}\sum_{y=1}^{n}\left|\left(I'_{1p}(x, y) - \|Norm_{1p}\|\right) - \left(I'_{2p}(x + Vx, y + Vy) - \|Norm_{2p}(x + Vx, y + Vy)\|\right)\right|$$

(Equation 16)

Additionally, the pattern matching module 62 preferably ceases scanning upon yielding a pattern matching score less than a second target score, and the motion vector determiner 65 preferably determines the motion vector based on the first displacement which yields the pattern matching score less than the second target score. The second target score is typically equal to 5% of an average of the normalized pixel values of the first frame element 410 of the first image frame 200.

The method described above is preferably used to determine a first motion vector using a first image frame 200 and a second image frame 230, and used again to determine a second motion vector using a third image and a fourth image. If the first motion vector and the second motion vector are substantially equal, the value of the motion vector is preferably considered consistent. Otherwise, additional determinations of motion vectors are preferably performed until two consecutive determinations of motion vectors, for different pairs of images, are substantially equal.

By way of a non-limiting example, the example application already described above with reference to FIGS. 6 and 7A is again considered. The example application comprises the system 10 of FIG. 1 imaging a person juggling objects at a distance of approximately 4 meters from a webcam. In the example application, the system 10 of FIG. 1 defines a first motion vector substantially equal to a second motion vector when $$2 * \frac{Len(V_1 - V_2)}{Len(V_1 + V_2)} < 30\%,$$

where $V_1$ is the first motion vector, $V_2$ is the second motion vector, and Len is a function measuring the length of a vector. The function Len(V) is defined as:

$$Len(V) = |V_x| + |V_y|.$$

It is to be appreciated that determining the second motion vector by using a third image and a fourth image can be done by using the second image frame 230 of the first determination as the first image frame 200 of the second determination, and using the third image as the second image frame 230 of the second determination.

The motion vector determiner 65 generally determines the motion vector in units of, by way of a non-limiting example, pixels per second. It is well known in the art that further conversions of the motion vector to other units, such as, by way of a non-limiting example, meters per second, are easily performed based on optical and physical data of the digital video source.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. A computer system for real-time determination of a motion vector of a frame element within an image frame in a stream of video image frames, the stream including at least a first image frame and a second image frame, the system comprising a plurality of operatively connected elements including:
   an image stream receiver to receive the stream of image frames;
   an image decomposer to decompose each of the image frames into a plurality of frame elements, each of the frame elements including a plurality of pixels and a plurality of associated pixel values;
   an image normalizer to normalize the pixel values of the frame elements of each of the image frames thereby yielding a plurality of normalized frame elements having a plurality of associated normalized pixel values;
   an image processor to apply an image processing filter to one of the normalized frame elements of the first image frame, yielding a filtered frame element having a plurality of associated filtered pixel values;
   a pixel selector to select a first reference pixel from the filtered frame element, such that the first reference pixel has the highest value of the filtered pixel values;
   an optic flow module to determine a first optic flow based on an optic flow equation applied at a location of the first reference pixel;
   a pattern matching module to perform pattern matching between the normalized pixel values of:
      the one normalized frame element of the first image frame; and
      the normalized frame elements of the second image frame, being test frame elements, yielding a plurality of pattern matching scores, each of the test frame elements having one of the pattern matching scores, wherein the pattern matching is performed such that for each one of the test frame elements, a displacement vector between a location of the one normalized frame element and a location of the one test frame element is restricted by a region which is at least partially based on the first optic flow; and
   a motion vector determiner to determine a motion vector at least partially based on the displacement vector associated with one of the test frame elements having a lowest one of the pattern matching scores, wherein the pattern matching module is operative to define the region as being bounded by a first line and a second line, such that: the first line intersects the second line at an intersection; a third line bisects an angle between the first line and the second line; the third line is in a direction based at least partly on a direction of the first optic flow; and the third line and the first line subtend an angle epsilon.

2. The system of claim 1 and wherein the stream of video image frames is a stream of color image frames, and for each one of the pixels an associated one of the pixel values is a value of a luminosity component associated with the one pixel.

3. The system of claim 1 and wherein the image processing filter is a contrast enhancing filter.

4. The system of claim 3 and wherein the contrast enhancing filter is a Sobel filter.

5. The system of claim 1 and wherein the pattern matching module computes the pattern matching score based on a sum of absolute values of differences between the normalized pixel values of the one normalized frame element and corresponding normalized pixel values of the one test frame element.

6. The system of claim 1 and wherein the pattern matching module determines the angle epsilon independently of the first optic flow.

7. The system of claim 1 and wherein:
the pixel selector further selects a second reference pixel from the filtered frame element;
the optic flow module further determines a second optic flow based on the optic flow equation applied at a location of the second reference pixel; and
the pattern matching module is operative to perform a consistency check including checking that the angular difference between the second optic flow and the third line is less than, or equal to, the angle epsilon.

8. The system of claim 1 and wherein the pixel selector further selects a second reference pixel from the filtered frame element, such that the second reference pixel has a second highest value of the filtered pixel values, and wherein the optic flow module further determines a second optic flow based on the optic flow equation applied at a location of the second reference pixel.

9. The system of claim 8 and wherein the pattern matching module determines the angle epsilon based on an angular difference between the first optic flow and the second optic flow.

10. The system of claim 8 and wherein the pixel selector further selects a third reference pixel from the filtered frame element, such that the third reference pixel has a third highest value of the filtered pixel values, and wherein the optic flow module further determines a third optic flow based on the optic flow equation applied at a location of the third reference pixel.

11. The system of claim 1 and wherein the pattern matching module determines the angle epsilon at least partly based on a value of an angle epsilon used in determining the motion vector of a previous normalized frame element of the first image frame.

12. The system of claim 10 and wherein the pattern matching module is operative to perform a consistency check including checking that the angular difference between the third optic flow and the first optic flow is less than, or equal to, the angle epsilon.

13. The system of claim 1 and wherein the pattern matching module restricts the region so that a distance between the intersection and any location within the region is less than a maximum value.

14. The system of claim 13 and wherein the maximum value is one quarter of a smallest dimension of an image frame.

15. The system of claim 13 and further comprising determining the maximum value by converting from a maximum physical speed to a corresponding displacement, the converting being based at least partially on a frame rate of the stream of video image frames and at least one optical property.

16. The system of claim 13 and wherein the pattern matching module determines the maximum value based on a maximum value of a previous frame element of the first image frame and on a motion vector of the previous frame element of the first image frame.

17. The system of claim 13 and wherein the pattern matching module computes the distance as a sum of an absolute value of a horizontal displacement and an absolute value of a vertical displacement.

18. The system of claim 1 and wherein if the lowest one of the pattern matching scores is greater than a first target score, the motion vector determiner determines the motion vector to be of zero magnitude.

19. The system of claim 1 and wherein the pattern matching module ceases pattern matching as soon as a pattern matching score is yielded which is less than a second target score.

20. The system of claim 19 and wherein the pattern matching module determines the second target score as 5% of an average of the pixel values of the one normalized frame element of the first image frame.

21. The system of claim 1 and wherein the displacement vector having a beginning and an end, the beginning of the display vector is at the intersection, and the pattern matching module: performs a first pattern matching with a first one of the test frame elements with the end of the displacement vector at the intersection; and performs additional pattern matching with additional test frame elements by scanning the end of the displacement vector through the region.

22. A method for real-time determination, by a processor, of a motion vector of a frame element within an image frame in a stream of video image frames, the stream including at least a first image frame and a second image frame, the method comprising:
receiving the stream of image frames;
decomposing each of the image frames into a plurality of frame elements, each of the frame elements including a plurality of pixels and a plurality of associated pixel values;
normalizing the pixel values of the frame elements of each of the image frames thereby yielding a plurality of normalized frame elements having a plurality of associated normalized pixel values;
applying an image processing filter to one of the normalized frame elements of the first image frame, yielding a filtered frame element having a plurality of associated filtered pixel values;
selecting a first reference pixel from the filtered frame element, such that the first reference pixel has the highest value of the filtered pixel values;
determining a first optic flow based on an optic flow equation applied at a location of the first reference pixel;
performing pattern matching between the normalized pixel values of:
the one normalized frame element of the first image frame; and
the normalized frame elements of the second image frame, being test frame elements, yielding a plurality of pattern matching scores, each of the test frame elements having one of the pattern matching scores, wherein the pattern matching is performed such that for each one of the test frame elements, a displacement vector between a location of the one normalized frame element and a location of the one test frame element is restricted by a region which is at least partially based on the first optic flow;
determining a motion vector at least partially based on the displacement vector associated with one of the test frame elements having a lowest one of the pattern matching scores; and
defining the region as being bounded by a first line and a second line, such that: the first line intersects the second line at an intersection; a third line bisects an angle between the first line and the second line; the third line is in a direction based at least partly on a direction of the first optic flow; and the third line and the first line subtend an angle epsilon.

23. A computer system for real-time determination of a motion vector of a frame element within an image frame in a stream of video image frames, the stream including at least a first image frame and a second image frame, the system comprising a plurality of operatively connected elements including:

means for receiving the stream of image frames;
  means for decomposing each of the image frames into a plurality of frame elements, each of the frame elements including a plurality of pixels and a plurality of associated pixel values;
  means for normalizing the pixel values of the frame elements of each of the image frames thereby yielding a plurality of normalized frame elements having a plurality of associated normalized pixel values;
  means for applying an image processing filter to one of the normalized frame elements of the first image frame, yielding a filtered frame element having a plurality of associated filtered pixel values;
  means for selecting a first reference pixel from the filtered frame element, such that the first reference pixel has the highest value of the filtered pixel values;
  means for determining a first optic flow based on an optic flow equation applied at a location of the first reference pixel;
  means for performing pattern matching between the normalized pixel values of:
    the one normalized frame element of the first image frame; and
    the normalized frame elements of the second image frame, being test frame elements, yielding a plurality of pattern matching scores, each of the test frame elements having one of the pattern matching scores, wherein the pattern matching is performed such that for each one of the test frame elements, a displacement vector between a location of the one normalized frame element and a location of the one test frame element is restricted by a region which is at least partially based on the first optic flow;
  means for defining the region as being bounded by a first line and a second line, such that: the first line intersects the second line at an intersection; a third line bisects an angle between the first line and the second line; the third line is in a direction based at least partly on a direction of the first optic flow; and the third line and the first line subtend an angle epsilon; and
  means for determining a motion vector at least partially based on the displacement vector associated with one of the test frame elements having a lowest one of the pattern matching scores.

* * * * *